United States Patent
Baccouche et al.

(10) Patent No.: US 10,906,496 B2
(45) Date of Patent: Feb. 2, 2021

(54) MIDDLE PILLAR SUPPORT BEAM

(71) Applicant: Ford Global Technologies, LLC, Dearborn, MI (US)

(72) Inventors: Mohamed Ridha Baccouche, Ann Arbor, MI (US); Rahul Arora, Birmingham, MI (US); Saeed David Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 211 days.

(21) Appl. No.: 15/933,569

(22) Filed: Mar. 23, 2018

(65) Prior Publication Data

US 2019/0291680 A1 Sep. 26, 2019

(51) Int. Cl.
| | |
|---|---|
| *B60R 21/16* | (2006.01) |
| *B60R 21/213* | (2011.01) |
| *B60R 21/2342* | (2011.01) |
| *B62D 25/00* | (2006.01) |
| *B60R 21/2165* | (2011.01) |
| *B60R 21/231* | (2011.01) |
| *B60R 21/00* | (2006.01) |

(52) U.S. Cl.
CPC ........ *B60R 21/213* (2013.01); *B60R 21/2165* (2013.01); *B60R 21/2342* (2013.01); *B62D 25/00* (2013.01); *B60R 2021/0006* (2013.01); *B60R 2021/23107* (2013.01); *B60R 2021/23161* (2013.01)

(58) Field of Classification Search
CPC . B60R 21/232; B60R 21/214; B60R 21/2338; B60R 2021/2316; B60N 2/143

USPC .................. 280/730.1, 730.2, 743.1
See application file for complete search history.

(56) References Cited

U.S. PATENT DOCUMENTS

| | | | | |
|---|---|---|---|---|
| 3,243,822 A | * | 4/1966 | Lipkin | A41D 13/018 2/455 |
| 3,779,577 A | | 12/1973 | Wilfert | |
| 4,298,214 A | * | 11/1981 | Brown, Jr. | B60R 21/213 280/735 |
| 5,934,701 A | * | 8/1999 | Furukawa | B60R 21/231 280/729 |
| 7,195,276 B2 | * | 3/2007 | Higuchi | B60R 21/231 280/729 |
| 7,448,674 B2 | | 11/2008 | Brunner et al. | |
| 9,725,064 B1 | | 8/2017 | Faruque et al. | |
| 9,744,932 B1 | | 8/2017 | Faruque et al. | |
| 10,315,609 B2 | * | 6/2019 | Thomas | B60R 21/231 |
| 10,407,018 B2 | * | 9/2019 | Sundararajan | B60R 21/214 |
| 10,427,578 B2 | * | 10/2019 | Deckard | B60J 5/0412 |
| 10,471,923 B2 | * | 11/2019 | Jimenez | B60R 21/231 |
| 2006/0214401 A1 | * | 9/2006 | Hirata | B60R 21/232 280/730.1 |
| 2009/0293774 A1 | * | 12/2009 | Cheung | A47B 5/06 108/44 |

(Continued)

*Primary Examiner* — Toan C To
(74) *Attorney, Agent, or Firm* — Frank A. MacKenzie; Bejin Bieneman PLC

(57) ABSTRACT

A vehicle includes a roof, a floor spaced from the roof, and sides spaced from each other in a cross-vehicle direction. The sides extend from the roof to the floor. Front seats and rear seats are supported by the floor. A beam is spaced from the roof and the floor and extends between the front and rear seats from one side to the other side in the cross-vehicle direction.

19 Claims, 5 Drawing Sheets

(56) References Cited

U.S. PATENT DOCUMENTS

| | | | |
|---|---|---|---|
| 2010/0090447 A1* | 4/2010 | Deng | B60R 21/214 280/730.1 |
| 2012/0133114 A1* | 5/2012 | Choi | B60R 21/214 280/728.2 |
| 2013/0069348 A1* | 3/2013 | Choi | B60R 21/214 280/730.2 |
| 2015/0142245 A1* | 5/2015 | Cuddihy | B60N 2/143 701/23 |
| 2016/0152163 A1* | 6/2016 | Strasdat | B60R 7/04 296/64 |
| 2016/0347137 A1* | 12/2016 | Despres-Nadeau | B60G 3/20 |
| 2017/0210329 A1 | 7/2017 | Rao et al. | |
| 2017/0361802 A1 | 12/2017 | Farooq et al. | |

* cited by examiner

MIDDLE PILLAR SUPPORT BEAM

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. This may allow the occupants of the seats to face each other and to interact.

During a vehicle impact, occupants may move in a direction influenced by the momentum of the vehicle along with principal direction of impact force. The seating configuration of occupants inside a vehicle will influence their kinematics.

DETAILED DESCRIPTION

Figure 1:
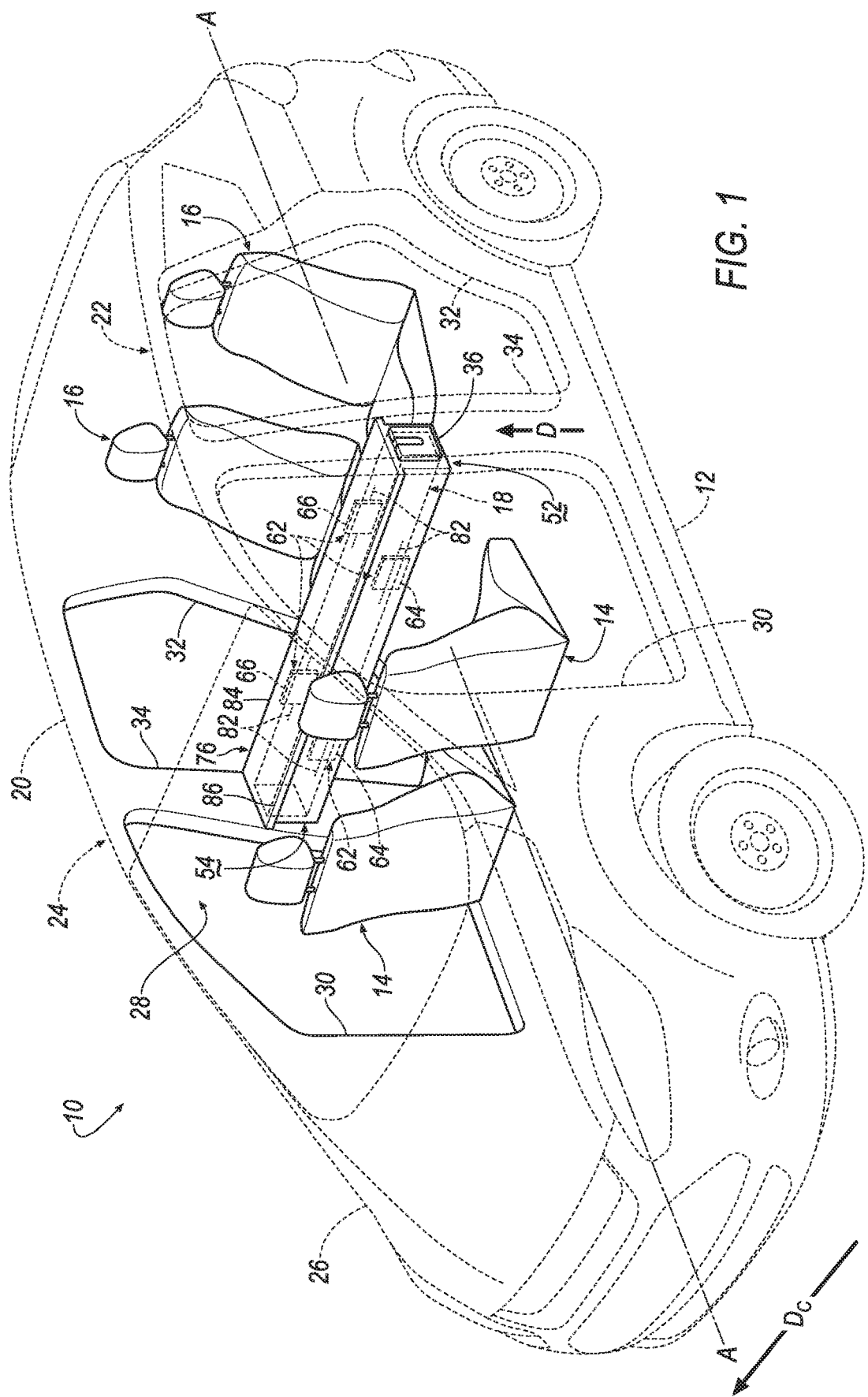
FIG. 1 is a perspective view of a vehicle including a beam extending between front seats and rear seats and supporting a plurality of airbags in an uninflated position.

A vehicle includes a floor, a roof, spaced from the floor, and sides spaced from each other in a cross-vehicle direction and extending from the roof to the floor. Front seats and rear seats are supported by the floor. A beam is spaced from the roof and the floor and extends between the front and rear seats from one side to the other side in the cross-vehicle direction.

An airbag may be supported by the beam.

A cover may extend in the cross-vehicle direction from one side to the other side. The cover including a tear seam adjacent the airbag.

A plurality of rear airbags may be supported by the beam. Each rear airbag may be inflatable away from the beam toward one rear seat, respectively.

A plurality of front airbags may be supported by the beam. Each front airbag may be inflatable away from the beam toward one front seat, respectively.

Each side may include a middle pillar. The beam may extend from one middle pillar to the other middle pillar.

Each side may include a bracket slidably engaged with the beam.

The beam may include a front surface facing the front seats and a rear surface facing the rear seats. The beam may include a rear flange extending from the rear surface toward the rear seats.

The beam may include a front flange extending from the front surface toward the front seats.

The rear seats may face the beam.

The front seats may face the beam.

A vehicle includes a floor, a roof spaced from the floor, and sides spaced from each other in a cross-vehicle direction and extending from the roof to the floor. Each side includes front and rear pillars spaced from each other and a middle pillar disposed between the front and rear pillars. A beam is spaced from the roof and extends from one middle pillar to the other middle pillar in the cross-vehicle direction.

An airbag may be supported by the beam.

A cover may extend in the cross-vehicle direction from one side to the other side. The cover including a tear seam adjacent the airbag.

A plurality of rear airbags may be supported by the beam. Each rear airbag may be inflatable away from the beam toward one rear seat, respectively.

A plurality of front airbags may be supported by the beam. Each front airbag may be inflatable away from the beam toward one front seat, respectively.

Each side may include a bracket slidably engaged with the beam.

Front seats and rear seats may be supported by the floor. The rear seats may face the beam.

The front seats may face the beam.

The beam may include a front surface facing the front seats and a rear surface facing the rear seats. The beam may include a rear flange extending from the rear surface toward the rear seats and a front flange extending from the front surface toward the front seats.

With reference to the Figures, wherein like numerals indicate like parts throughout the several views, a vehicle 10 is generally shown. The vehicle 10 includes a floor 12, front seats 14 and rear seats 16 supported by the floor 12, and a beam 18 extending between the front and rear seats 14, 16 in a cross-vehicle direction Dc. The beam 18 may provide structural support, i.e., a mounting surface, for vehicle components, e.g., a radio, a display screen, an airbag, or other vehicle components, between the front seats 14 and the rear seats 16. The vehicle components may be mounted on the beam 18 to face occupants of the front seats 14 and/or the rear seats 16. In other words, occupants of the front seats 14 and/or the rear seats 16 may be able to interact with the vehicle components while seated in the vehicle 10.

The vehicle 10 includes a roof 20 spaced from the floor 12, and sides 22, 24 spaced from each other in the cross-vehicle direction Dc and extending from the roof 20 to the floor 12. The beam 18 is disposed between the roof 20 and the floor 12 and extends from one side 22 to the other side 24 of the vehicle 10 in the cross-vehicle direction Dc. The location of the beam 18 between the roof 20 and the floor 12 facilitates interaction between the occupants of the vehicle 10 and the vehicle components. Since the beam 18 extends from one side 22 of the vehicle 10 to the other side 24 of the vehicle 10, the beam 18 provides reinforcement to the vehicle 10 during a vehicle impact, e.g., a side impact. During a side impact, the beam 18 transfers a force of the vehicle impact from one side 22, e.g., the impacted side, to the other side 24, e.g., the unimpacted side, of the vehicle 10. In other words, the beam 18 may reinforce the vehicle 10 in the cross-vehicle direction Dc. By reinforcing the vehicle 10 in the cross-vehicle direction Dc, the beam 18 may prevent or reduce intrusion on the impacted side of the vehicle 10.

The vehicle 10 may, for example, be any suitable type of automobile. The vehicle 10 may, for example, be an autonomous vehicle. In this situation, the vehicle 10 may allow for the elimination of a steering wheel. For example, the vehicle 10 shown in FIG. 1 does not include the steering wheel. The vehicle 10 may have a computer (not shown) that may control the operations of the vehicle 10 in an autonomous mode, a semi-autonomous mode, and/or a non-autonomous mode. An autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle 10 propulsion, braking, and steering.

The sides 22, 24 of the vehicle 10 may be elongated along a longitudinal axis A transverse to the cross-vehicle direction Dc. Each side 22, 24 of the vehicle 10 may be similar or identical to each other. Common numerals are used to identify common features on each side 22, 24 of the vehicle 10. The two sides 22, 24 of the vehicle 10 may be mirror images of each other about the longitudinal axis A of the vehicle 10, as shown in the Figures.

The vehicle 10 may include a vehicle body 26 defining a passenger cabin 28 to house occupants, if any, of the vehicle 10. The passenger cabin 28 includes the front seats 14 disposed at a front (not numbered) of the passenger cabin 28 and the rear seats 16 spaced from the front seats 14, e.g., along the longitudinal axis A. The rear seats 16 may be, for example, disposed behind the front seats 14 in the passenger cabin 28, e.g., at a rear (not numbered) of the passenger cabin 28. The passenger cabin 28 may also include third-row seats (not shown) at the rear of the passenger cabin 28, in which case the front seats 14 may be second-row seats (not numbered) instead of or in addition to being front seats 14. The front seats 14 and the rear seats 16 may be a same or different type of seat. The front seats 14 and rear seats 16 may be any suitable type of seats. The front seats 14 and the rear seats 16 may be, for example, a bucket seat, as shown in FIG. 1.

Figure 2:
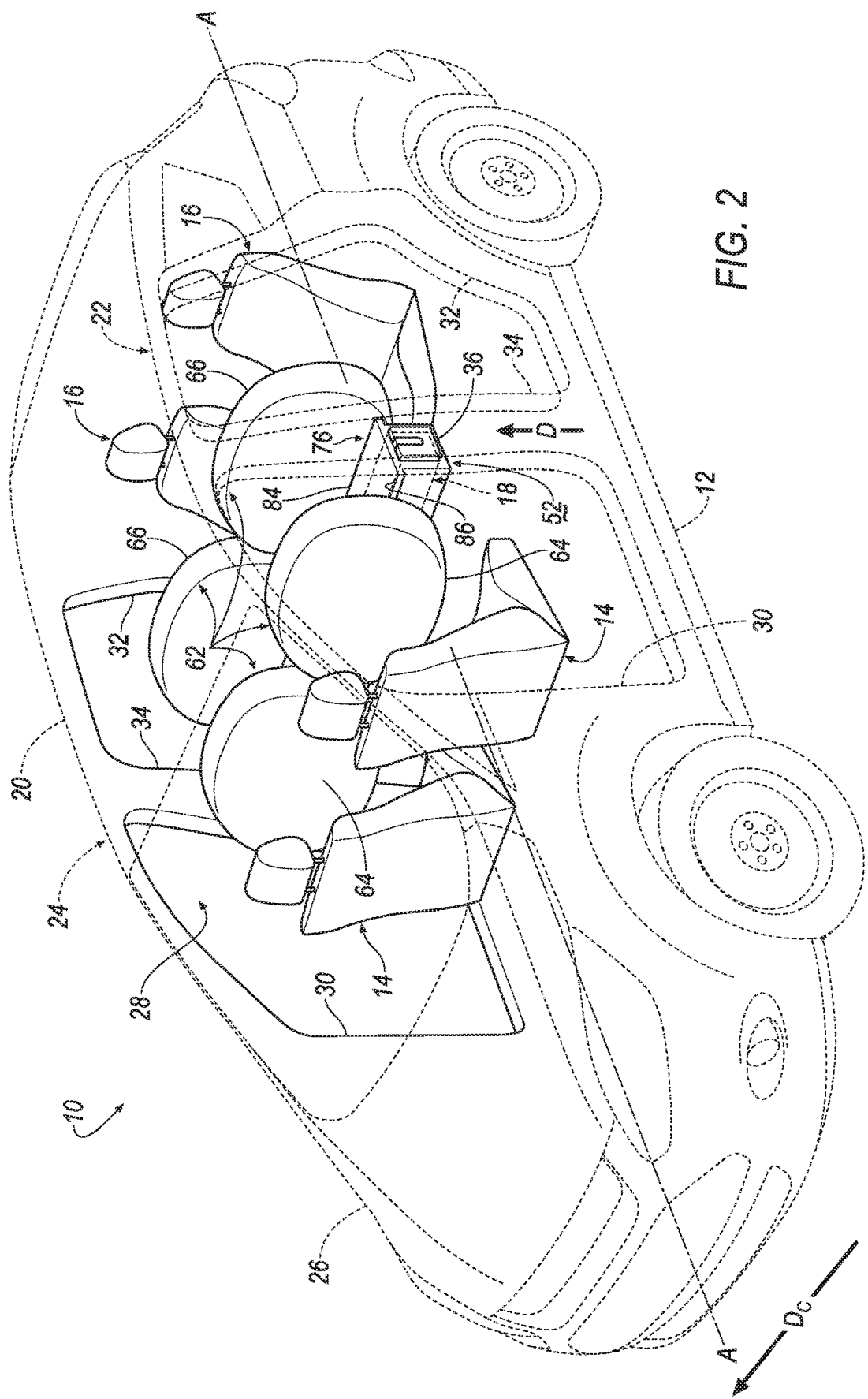
FIG. 2 is a perspective view of the vehicle including the plurality of airbags in the inflated position.
Figure 3:
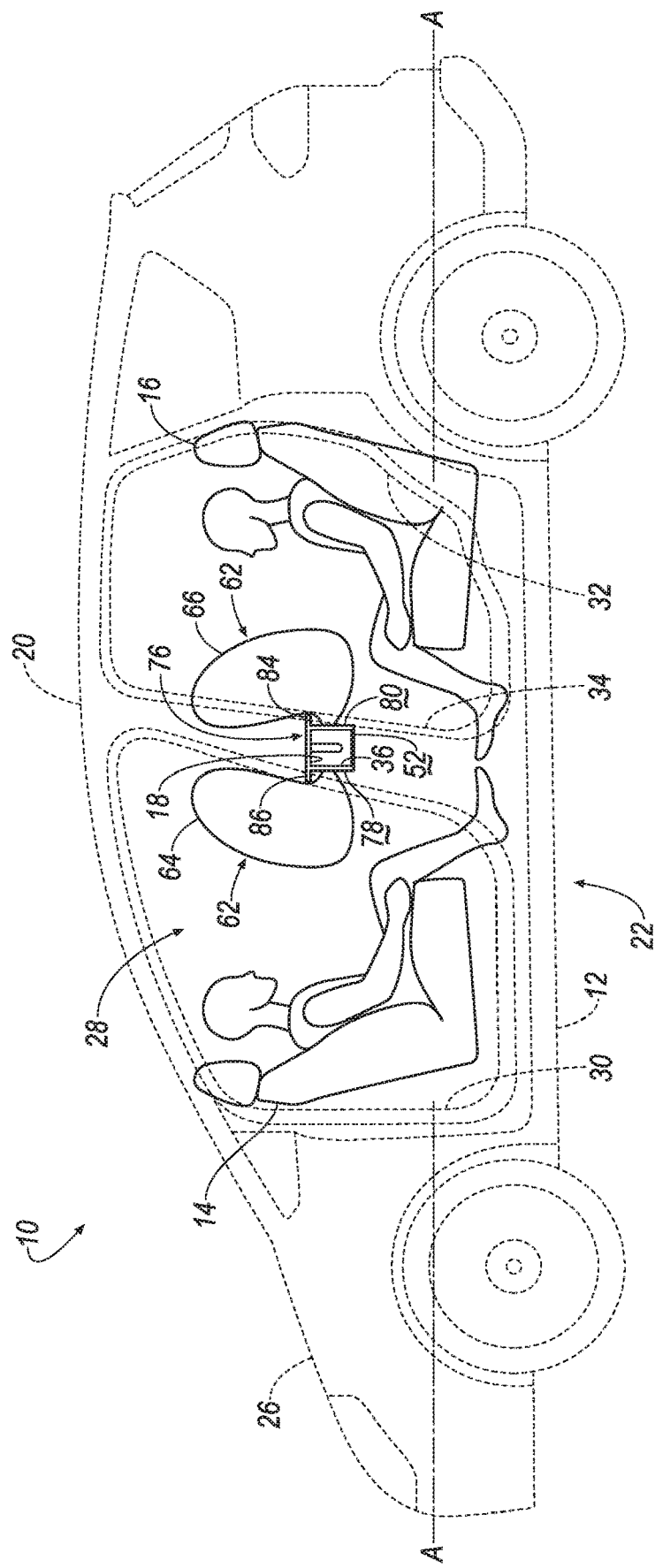
FIG. 3 is a side view of the vehicle of FIG. 2.

The rear seats 16 are disposed behind the beam 18. In other words, the beam 18 is disposed between the front of the passenger cabin 28 and the rear seats 16. The rear seats 16 face the beam 18, as shown in FIGS. 1-3. In other words, the rear seats 16 face the front of the passenger cabin 28.

The front seats 14 are disposed in front of the beam 18. In other words, the beam 18 is disposed between the rear of the passenger cabin 28 and the front seats 14. The front seats 14 may, for example, face the rear of the passenger cabin 28. In this situation, the front seats 14 may face the beam 18, as shown in FIGS. 1-3. In other words, the front seats 14 may face the rear seats 16, i.e., the front seats 14 and the rear seats 16 may face opposite directions. Alternatively, the front seats 14 may face the front of the passenger cabin 28. In this situation, the front seats 14 may face away from the beam 18. In other words, the front seats 14 and the rear seats 16 may face the front of the passenger cabin 28, i.e., the front seats 14 and the rear seats 16 may face the same direction.

With reference to FIG. 1, the vehicle body 26 may have the floor 12, the roof 20, and a plurality of pillars 30, 32, 34 extending from the floor 12 to the roof 20. For example, the pillars 30, 32, 34 may include a front pillar 30, a rear pillar 32 spaced from the front pillar 30, and a middle pillar 34 disposed between the front pillar 30 and the rear pillar 32 along the longitudinal axis A. The front pillar 30 of each side 22, 24 may be disposed adjacent to the front of the passenger cabin 28, e.g., an A-pillar. The rear pillar 32 of each side 22, 24 may be disposed adjacent to the rear of the passenger cabin 28, e.g., a C-pillar.

The middle pillar 34 is disposed along the longitudinal axis A between the front seats 14 and the rear seats 16, as shown in FIG. 3. In other words, the front seats 14 and the rear seats 16 may be on opposite sides of the middle pillar 34. The middle pillar 34 may, for example, be a B-pillar. Alternatively, when the vehicle body 26 includes more than three pillars, e.g., a D-pillar, the middle pillar 34 may be any suitable pillar between the front pillar 30 and the rear pillar 32.

The roof 20 and the floor 12 may extend across the passenger cabin 28, i.e., from one side 22 to the other side 24 of the vehicle 10, as shown in FIGS. 1 and 2. The roof 20 and the floor 12 may be fixed to each side 22, 24 of the vehicle 10, e.g., by welding.

With reference to FIG. 1, the beam 18 may be elongated in the cross-vehicle direction Dc from one side 22 of the vehicle 10 to the other side 24 of the vehicle 10. For example, the beam 18 may extend from one middle pillar 34 to the other middle pillar 34. In other words, the beam 18 may be disposed between the front seats 14 and rear seats 16 along the longitudinal axis A. The beam 18 may be disposed between the roof 20 and the floor 12. In other words, the beam 18 may be spaced from both the roof 20 and the floor 12. The beam 18 may be spaced from both the roof 20 and the floor 12 any suitable amount.

The beam 18 may have any suitable cross-sectional shape, e.g., square, rectangle, trapezoid, etc. The beam 18 may, for example, be solid, i.e., have a continuous cross-section. Alternatively, the beam 18 may be hollow. In other words, the beam 18 may include a void (not shown) in cross-section, i.e., extending in the cross-vehicle direction Dc. The beam 18 may be formed of any suitable material, e.g., extruded aluminum, steel, plastic, etc.

Figure 4A:
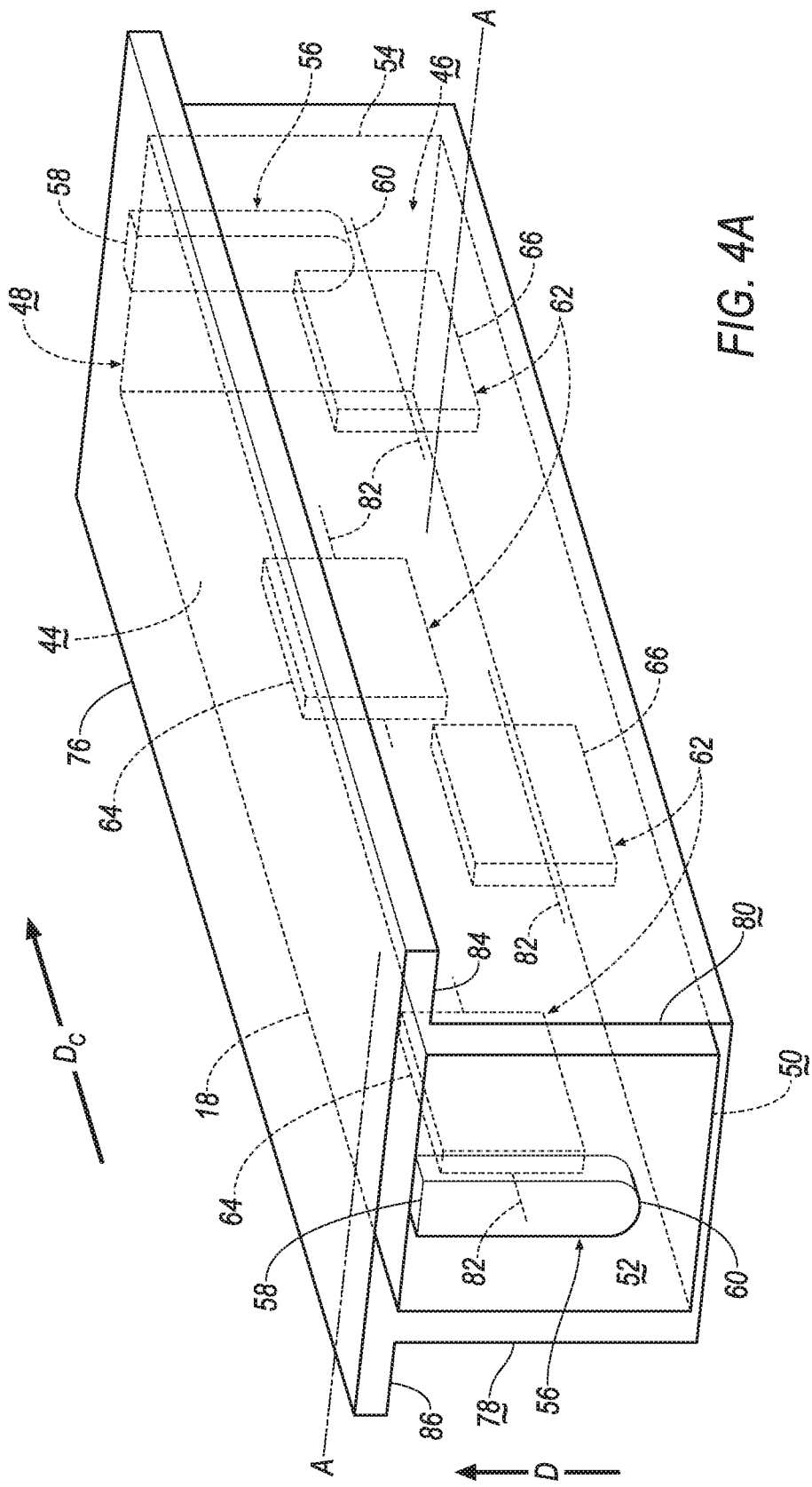
FIG. 4A is a perspective view of the beam.

The beam 18 may include a front surface 44 facing the front seats 14, i.e., the front of the passenger cabin 28 and a rear surface 46 facing the rear seats 16, i.e., the rear of the passenger cabin 28. The front surface 44 and the rear surface 46 may be spaced from each other along the longitudinal axis A, as shown in FIG. 4A. In other words, the front surface 44 may be disposed between the rear surface 46 and the front seats 14, and the rear surface 46 may be disposed between the front surface 44 and the rear seats 16.

The beam 18 may include a top surface 48 and a bottom surface 50 spaced from each other in the direction D, as shown in FIG. 4A. The top surface 48 and the bottom surface 50 each extend from the front surface 44 to the rear surface 46. The top surface 48 may face the roof 20 and the bottom surface 50 may face the floor 12. In other words, the top surface 48 may be disposed between the bottom surface 50 and the roof 20, and the bottom surface 50 may be disposed between the top surface 48 and the floor 12.

The beam 18 may include ends 52, 54 adjacent to each side 22, 24 of the vehicle 10, i.e., each middle pillar 34, respectively, as shown in FIG. 1. The ends 52, 54 are supported by and connected to the sides 22, 24, respectively. As an example, each end 52, 54 may include one of a tongue 56 and a bracket 36, and each side 22, 24 may include the other of the tongue 56 and the bracket 36. In the example shown in the figures, the tongues 56 are on the ends 52, 54, respectively, and the brackets 36 are on the sides 22, 24, respectively.

With reference to FIG. 1, the bracket 36 may support each end 52, 54 of the beam 18 in the vehicle 10. The bracket 36 may, for example, be fixed to each middle pillar 34, respectively. The bracket 36 may be formed of any suitable metal, e.g., steel, extruded aluminum, etc. The bracket 36 may be fixed to each side 22, 24 of the vehicle 10, e.g., the middle pillar 34, in any suitable manner, e.g., fasteners, welding, etc.

Figure 4B:
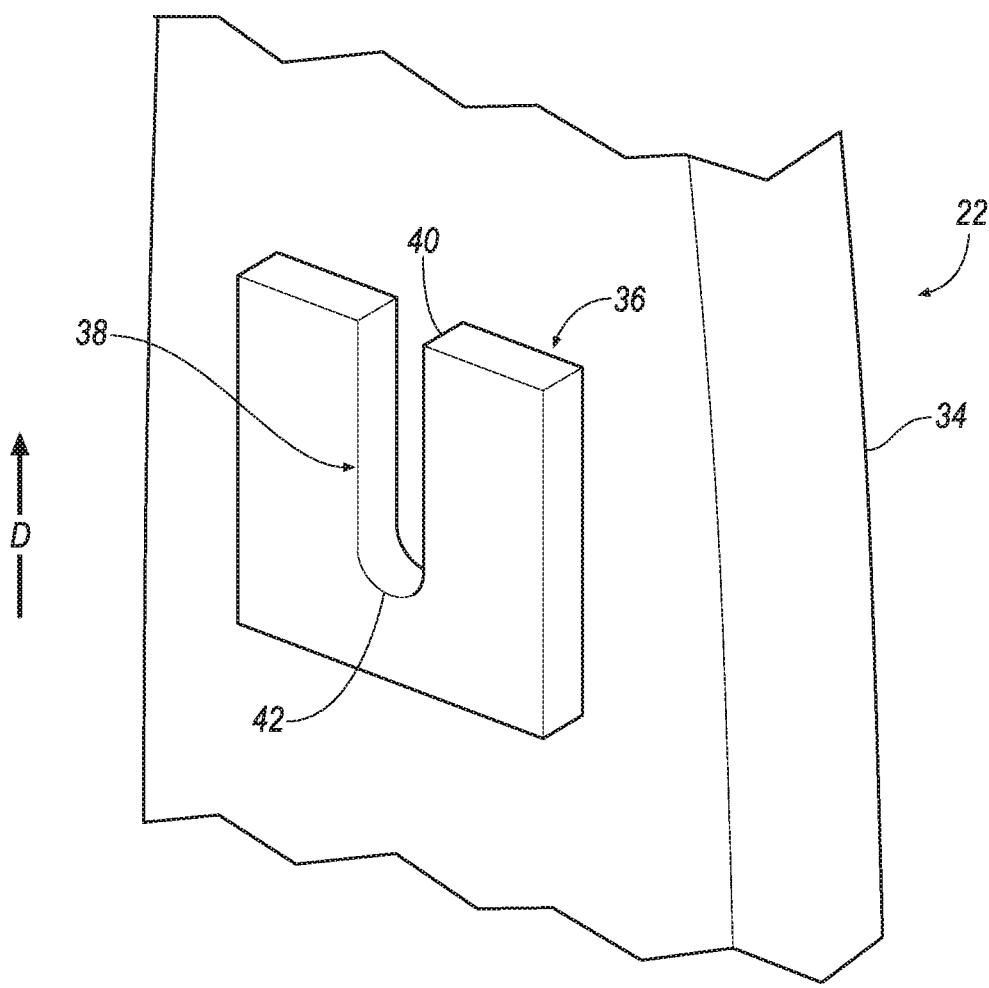
FIG. 4B is a magnified view of one side of the vehicle including a bracket attached to a middle pillar.

With reference to FIG. 4B, each bracket 36 may include a slot 38 extending in a direction D from the floor 12 to the roof 20. The slot 38 may include a closed side 42 and an open side 40 spaced from the closed side 42, e.g., in the direction D from the floor 12 to the roof 20. The open side 40 may be disposed between the closed side 42 and the roof 20. The open side 40 of the slot 38 may extend transverse to the cross-vehicle direction Dc, e.g., along the longitudinal axis A, and the closed side 42 of the slot 38 may be concave relative to the cross-vehicle direction Dc. In other words, the closed side 42 of the slot 38 may curve toward the roof 20 of the vehicle 10.

Each tongue 56 extends outwardly from the ends 52, 54, as shown in FIG. 4A. Each tongue 56 may extend any suitable amount in the cross-vehicle direction Dc. Each tongue 56 may be elongated in the direction D from the floor 12 to the roof 20, i.e., transverse to both the cross-vehicle direction Dc and the longitudinal axis A.

With reference to FIG. 4A, each tongue 56 may include a top edge 58 and a bottom edge 60 spaced from the top edge 58. The top edge 58 of the tongue 56 may, for example, be disposed at the top surface 48 of the beam 18. Alternatively, the top edge 58 of the tongue 56 may be disposed between the bottom edge 60 of the tongue 56 and the top surface 48 of the beam. The bottom edge 60 of the tongue 56 may, for example, be disposed between the top edge 58 of the tongue 56 and the bottom surface 50 of the beam 18. Alternatively, the bottom edge 60 of the tongue 56 may be disposed at the bottom surface 50 of the beam 18. The top edge 58 may extend along the longitudinal axis A and the bottom edge 60 may be curved upwardly, i.e., toward the top surface 48 of the beam 18.

The beam 18 may be slideably engaged with the brackets 36 in an engaged position. Specifically, the tongue 56 on each end 52, 54 of the beam 18 may be slideably engaged with the slot 38 of one bracket 36, respectively, in the engaged position. In the engaged position, the brackets 36 may support the beam 18 in the vehicle 10. For example, the brackets 36 prevent the beam 18 from moving relative to the vehicle body 26, e.g., the middle pillars 34. Additionally, or alternatively, the beam 18 may be attached to the brackets 36. The beam 18, e.g., the ends 52, 54, may be attached to the brackets 36 in any suitable manner, e.g., welding, fasteners, etc.

The tongue 56 may be configured, e.g., sized, shaped, and positioned, to slide into the slot 38 of the bracket 36. For example, the bottom edge 60 of the tongue 56 may match the curvature of the closed side 42 of the slot 38 of the bracket 36. As another example, the slot 38 may extend the same amount in the direction D from the floor 12 to the roof 20 as the tongue 56. In other words, when the beam 18 is in the engaged position, the bottom edge 60 of the tongue 56 abuts the closed side 42 of the slot 38, and the top edge 58 of the tongue 56 extends across the open side 40 of the slot 38.

The vehicle 10 may include an airbag assembly 62, which includes an airbag 64, 66. The airbag 64, 66 may be inflatable from an uninflated position, as shown in FIG. 1, to an inflated position, as shown in FIGS. 2 and 3. Additionally, each airbag 64, 66 inflates away from the beam 18 toward the respective seats 14, 16. The beam 18 may support the airbag assembly 62, and specifically, may support the airbag 64, 66 when the airbag 64, 66 is in the inflated position. The airbag assembly 62 may be mounted to the beam 18, as set forth below.

The airbag assembly 62 may include a base (not shown) attached to the beam 18 and supporting the airbag 64, 66. The base may be flat. As another example, the base may include a cavity (not shown) that may house the airbag 64, 66 in the uninflated position and may support the airbag 64, 66 on the beam 18 in the inflated position. In other words, the base may be a housing. The base may, for example, include clips, panels, etc. for attaching the airbag 64, 66, and for attaching the airbag assembly 62 to the beam 18.

The airbag 64, 66 may be formed of any suitable type of material or materials. The airbag 64, 66 may be formed of any suitable airbag material, for example, a woven polymer.

For example, the airbag 64, 66 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

The vehicle 10 may include any suitable number of airbag assemblies 62. As one example, the vehicle 10 may include one airbag assembly 62 for the front surface 44 and one airbag assembly 62 for the rear surface 46. In this situation, each airbag 64, 66 may extend from one side 22 of the vehicle 10 to the other side 24 of the vehicle 10 in the inflated position.

More specifically, the vehicle 10 may, for example, include one airbag assembly 62 for each seat 14, 16 in the vehicle 10, as shown FIGS. 1-3. In this situation, the vehicle 10 may include a plurality of airbag assemblies 62 supported by the front surface 44 of the beam 18 and a plurality of airbag assemblies 62 supported by the rear surface 46 of the beam 18. The front airbags 64 are inflatable away from the front surface 44 of the beam 18 toward the front seats 14, and the rear airbags 66 are inflatable away from the rear surface 46 of the beam 18 toward the rear seats 16, respectively, as shown in FIG. 2. The front airbags 64 may be spaced from each other along the beam 18, i.e., in the cross-vehicle direction Dc and the rear airbags 66 may be spaced from each other along the beam 18, i.e., in the cross-vehicle direction Dc.

The front airbags 64 and the rear airbags 66 may have a same or different size. The airbags 64, 66 may have any suitable size. For example, the airbags 64, 66 may inflate any suitable amount away from the beam 18 along the longitudinal axis A, i.e., toward the front seats 14 and the rear seats 16, respectively. As another example, the airbags 64, 66 may inflate any suitable amount toward the roof 20 and the floor 12. The front airbags 64 and the rear airbags 66 may have a same or different shape. The airbags 64, 66 may have any suitable shape in the inflated position, e.g., circular, rectangular, etc.

The airbag assembly 62 may include an inflator 68 in fluid communication with the airbag 64, 66 that inflates the airbag 64, 66 from the uninflated position to the inflated position. The inflator 68 expands the airbag 64, 66 with an inflation medium, such as a gas, to move the airbag 64, 66 from the uninflated position to the inflated position. The inflator 68 may be supported by the beam 18 or may be disposed in any other suitable location in the vehicle 10. Alternatively, the inflator 68 may be supported by the base.

The inflator 68 may be, for example, a pyrotechnic inflator that uses a chemical reaction to drive the inflation medium into the airbag 64, 66. Alternatively, the inflator 68 may be, for example, a cold-gas inflator that, when activated, ignites a pyrotechnic charge that creates an opening for releasing the pressurized inflation medium to the airbag 64, 66 via a fill tube (not numbered). Alternatively, the inflator 68 may be of any suitable type, for example, a hybrid inflator.

Figure 5:
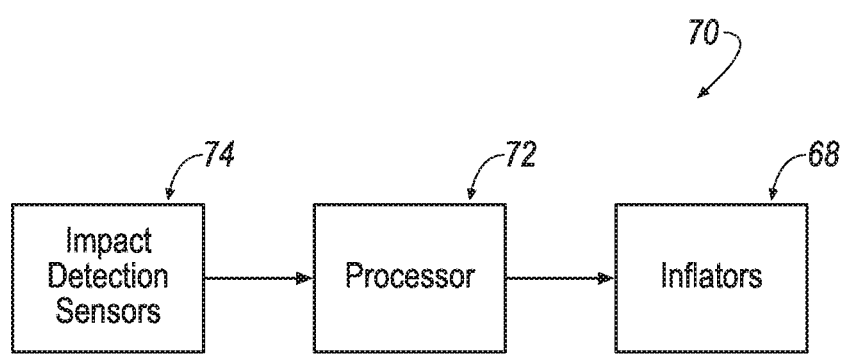
FIG. 5 is a flowchart of an inflation system of the vehicle.

With reference to FIG. 5, the vehicle 10 may include an inflation system 70. The inflation system 70 includes a processor 72 programmed to initiate an inflation of the airbag 64, 66 in response to the vehicle impact. The processor 72 may be embedded in a microcontroller. The microcontroller may include memory, etc. The memory of the microcontroller may store instructions executable by the processor 72 and the processor 72 may read the instructions from the memory and execute the instructions.

The vehicle 10 may include impact detection sensors 74 programmed to detect the vehicle impact to the vehicle 10. The impact detection sensors 74 may be disposed in the beam 18 or elsewhere in the vehicle 10. The impact detection sensors 74 may be of various types, e.g., pressure sensor, acceleration sensor, vision sensor, etc. When the vehicle impact occurs, the processor 72 may receive one or more signals from the impact detection sensors 74 indicating the vehicle impact. In response to receiving the signals from the impact detection sensors 74, the processor 72 may initiate the inflation of the airbag 64, 66. Alternatively, the processor 72 may initiate the inflation of the airbag 64, 66 selectively based on information from the impact detection sensors 74 identifying the physical characteristics of the vehicle impact, e.g., which side of the vehicle impacted, amount of pressure applied to the vehicle 10, etc. and also seat occupancy information, e.g., by using the occupancy sensors disposed inside the seats 14, 16 sensing the occupancy status of the seats 14, 16.

In order to receive the signals from the impact detection sensors 74 and to initiate the inflation of the airbag 64, 66 the processor 72 communicates with the impact detection sensors 74 and the inflator 68, e.g., through a direct electrical wiring, through which an analog or a digital signal is transmitted, or through a communication network like CAN (Control Area Network), Ethernet, LIN (Local Interconnect Network) or any other way.

With reference to FIG. 4A, a cover 76 may extend around the beam 18. The cover 76 may be elongated in the cross-vehicle direction Dc, i.e., from the one side 22 to the other side 24 of the vehicle 10. The cover 76 may, for example, extend over the front airbags 64 and the rear airbags 66. In other words, the front airbags 64 and the rear airbags 66 may be disposed between the front surface 44 and the rear surface 46, respectively, and the cover 76 in the uninflated position. In the inflated position, the front airbags 64 and the rear airbags 66 may extend through the cover 76, as set forth further below. The cover 76 may be attached to the beam 18 in any suitable manner, e.g., clips, fasteners, etc.

The cover 76 may include a front portion 78 facing the front seats 14 and a rear portion 80 facing the rear seats 16. The front portion 78 may extend across the front surface 44 of the beam 18, e.g., from the top surface 48 to the bottom surface 50, as shown in FIG. 4A. The rear portion 80 may extend across the rear surface 46 of the beam 18, e.g., from the top surface 48 to the bottom surface 50, as shown in FIG. 4A.

The cover 76 may include a tear seam 82 adjacent the airbag 64, 66. For example, the front portion 78 may include one tear seam 82 adjacent to each of the front airbags 64, and the rear portion 80 may include one tear seam 82 adjacent to each of the rear airbags 66, as shown in FIG. 4A. In this situation, each airbag 64, 66 may extend through one tear seam 82 in the inflated position, respectively.

The front portion 78 and the rear portion 80 may be a single unitary construction, as shown in FIG. 4A. Alternatively, the front portion 78 and the rear portion 80 may, for example, be connected to each other. In this situation, the front portion 78 and the rear portion 80 may each be engaged with each other and the beam 18. The front portion 78 and the rear portion 80 may be connected to each other in any suitable manner, e.g., clips, fasteners, etc. The cover 76 may be formed of any suitable material, e.g., plastic, nylon, etc.

The rear portion 80 may include a rear flange 84 extending along the longitudinal axis A toward the rear seats 16, and the front portion 78 may include a front flange 86 extending along the longitudinal axis A toward the front seats 14, as shown in FIG. 4A. The front flange 86 and the rear flange 84 may extend a same or a different amount toward the seats 14, 16. The front flange 86 and the rear flange 84 may extend any suitable amount toward the seats 14, 16.

The flanges 84, 86 may, for example, be disposed adjacent to the top surface 48 of the beam 18, as shown in FIG. 4A. As another example, the flanges 84, 86 may be disposed adjacent to the bottom surface 50 of the beam 18. As yet another example, the flanges 84, 86 may include an upper portion adjacent to the top surface 48 and a lower portion adjacent to the bottom surface 50 of the beam. In other words, the flanges 84, 86 may be disposed adjacent to both the top surface 48 and the bottom surface 50 of the beam.

The flanges 84, 86 may be elongated along the cross-vehicle direction Dc, i.e., from one side 22 to the other side 24 of the vehicle 10. For example, the flanges 84, 86 may be elongated from one end 52 to the other end 54 of the beam 18, as shown in FIG. 1. In other words, the flanges 84, 86 may extend continuously across the beam 18 in the cross-vehicle direction Dc. Alternatively, the flanges 84, 86 may be segmented, i.e., extend partially across the beam 18 in the cross-vehicle direction Dc, such that a plurality of flanges 84, 86 extend along the beam 18 in the cross-vehicle direction Dc. In this situation, the flanges 84, 86 may include a plurality of portions spaced from each other along the beam 18. The plurality of portions may, for example, be spaced from each other by one airbag 64, 66 such that one airbag 64, 66 extends between adjacent portions of the flanges 84, 86 in the inflated position.

During operation of the vehicle 10, the beam 18 may extend across the vehicle 10, i.e., from one side 22 to the other side 24, between the front seats 14 and the rear seats 16. The beam 18 may provide structural support for vehicle components, e.g., a radio, a display, etc., such that occupants of both the front seats 14 and the rear seats 16 may interact with the vehicle components. The cover 76, e.g., the flanges 84, 86 may provide a surface for the occupants to store objects and/or interact with each other during operation of the vehicle 10, as shown in FIG. 1. Additionally, the beam 18 may support the airbags 64, 66 for each of the front seats 14 and the rear seats 16 in the uninflated position, as shown in FIG. 1. When the impact detection sensors 74 sense an impact of the vehicle 10, the processor 72 triggers the inflator 68 to inflate the airbags 64, 66 with the inflation medium from the uninflated position to the inflated position. When the inflator 68 inflates the airbags 64, 66 to the inflated position, the inflation medium flows to the airbag 64, 66 increasing the pressure in the airbag 64, 66. As the pressure is increased, the airbag 64, 66 breaks through the tear seam 82 in the cover 76 and extends away from the beam 18. During the vehicle impact, e.g., a front impact or a rear impact, the occupants may move along the longitudinal axis A toward one of the front seats 14 and the rear seats 16. In this situation, the beam 18 may support the airbags 64, 66 to prevent or reduce the impact between occupants of the front seats 14 and occupants of the rear seats 16. Additionally, during a side impact, the beam 18 may transfer a force of the impact from one side 22 of the vehicle 10 to the other side 24 of the vehicle 10. By transferring the force through the beam 18, the beam 18 may prevent or reduce intrusion by the middle pillar 34 during the side impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a floor;
a roof spaced from the floor;
sides spaced from each other in a cross-vehicle direction and extending from the roof to the floor;
front seats and rear seats supported by the floor;
a beam spaced from the roof and the floor and extending between the front and rear seats from one side to the other side in the cross-vehicle direction; and
an airbag supported by the beam.

2. The vehicle of claim 1, further comprising a cover extending in the cross-vehicle direction from one side to the other side, the cover including a tear seam adjacent the airbag.

3. The vehicle of claim 1, further comprising a plurality of airbags supported by the beam, the plurality of airbags including the airbag and at least some of the airbags are inflatable away from the beam toward the rear seats.

4. The vehicle of claim 1, further comprising a plurality of airbags supported by the beam, the plurality of airbags including the airbag and at least some of the airbags are inflatable away from the beam toward the front seats.

5. The vehicle of claim 1, wherein each side includes a middle pillar, the beam extends from one middle pillar to the other middle pillar.

6. The vehicle of claim 5, wherein each side includes a bracket slideably engaged with the beam.

7. The vehicle of claim 1, wherein the beam includes a front surface facing the front seats and a rear surface facing the rear seats, the beam includes a rear flange extending from the rear surface toward the rear seats.

8. The vehicle of claim 7, wherein the beam includes a front flange extending from the front surface toward the front seats.

9. The vehicle of claim 1, wherein the rear seats face the beam.

10. The vehicle of claim 9, wherein the front seats face the beam.

11. A vehicle comprising:
a floor;
a roof spaced from the floor;
sides spaced from each other in a cross-vehicle direction and extending from the roof to the floor, each side including front and rear pillars spaced from each other and a middle pillar disposed between the front and rear pillars;
a beam spaced from the roof and the floor and extending from one middle pillar to the other middle pillar in the cross-vehicle direction; and
an airbag supported by the beam.

12. The vehicle of claim 11, wherein the beam includes a cover extending in the cross-vehicle direction from one side to the other side, the cover including a tear seam adjacent the airbag.

13. The vehicle of claim 11, further comprising a plurality of rear airbags supported by the beam, each rear airbag inflatable away from the beam toward one rear seat, respectively.

14. The vehicle of claim 11, further comprising a plurality of front airbags supported by the beam, each front airbag inflatable away from the beam toward one front seat, respectively.

15. The vehicle of claim 11, wherein each side includes a bracket slideably engaged with the beam.

16. The vehicle of claim 11, further comprising front seats and rear seats supported by the floor, and wherein the rear seats face the beam.

17. The vehicle of claim 16, wherein the front seats face the beam.

18. The vehicle of claim 16, wherein the beam includes a front surface facing the front seats and a rear surface facing the rear seats, the beam includes a rear flange extending from the rear surface toward the rear seats and a front flange extending from the front surface toward the front seats.

19. A vehicle comprising:
a floor;
a roof spaced from the floor;
sides spaced from each other in a cross-vehicle direction and extending from the roof to the floor;
front seats and rear seats supported by the floor and each including a seatback having a top and a front surface;
a beam disposed between the floor and the top of each seatback and extending between the front and rear seats from one side to the other side in the cross-vehicle direction, the beam is connected to each side;
the front surfaces of the front seats and the rear seats facing in opposite directions, the front surfaces of the front seats and the rear seats each facing the beam; and
an airbag supported by the beam.

* * * * *